US007133849B1

(12) United States Patent
Thiel

(10) Patent No.: US 7,133,849 B1
(45) Date of Patent: Nov. 7, 2006

(54) METHOD AND ARRANGEMENT FOR ENTERING CONTENTS OF A FRANKING IMPRINT INTO A POSTAGE METER MACHINE

(75) Inventor: Wolfgang Thiel, Berlin (DE)

(73) Assignee: Francotyp-Postalia AG & Co. KG (DE)

(*) Notice: Subject to any disclaimer, the term of this patent is extended or adjusted under 35 U.S.C. 154(b) by 1095 days.

(21) Appl. No.: 09/527,138

(22) Filed: Mar. 16, 2000

(30) Foreign Application Priority Data

Mar. 17, 1999 (DE) ................................ 199 13 066

(51) Int. Cl.
*G06F 17/00* (2006.01)

(52) U.S. Cl. ........................................................ 705/401

(58) Field of Classification Search ................ 705/401, 705/404, 408, 409, 410; 283/71
See application file for complete search history.

(56) References Cited

U.S. PATENT DOCUMENTS

| | | | | |
|---|---|---|---|---|
| 4,424,573 | A | 1/1984 | Eckert, Jr. et al. | |
| 4,525,786 | A | 6/1985 | Crowley et al. | |
| 4,528,644 | A | 7/1985 | Soderberg et al. | |
| 4,764,234 | A | 8/1988 | Smits et al. | |
| 4,783,745 | A | 11/1988 | Brookner et al. | |
| 4,802,218 | A * | 1/1989 | Wright et al. | 235/375 |
| 4,837,714 | A | 6/1989 | Brookner et al. | |
| 4,900,903 | A * | 2/1990 | Wright et al. | 235/380 |
| 4,900,904 | A * | 2/1990 | Wright et al. | 705/407 |
| 5,262,939 | A * | 11/1993 | Vanpoucke | 705/401 |
| 5,471,925 | A | 12/1995 | Heinrich et al. | |
| 5,490,077 | A | 2/1996 | Freytag | |
| 5,606,508 | A | 2/1997 | Thiel | |
| 5,699,258 | A | 12/1997 | Thiel | |
| 5,710,706 | A | 1/1998 | Märkl et al. | |
| 5,825,813 | A | 10/1998 | Na | |
| 5,852,813 | A * | 12/1998 | Guenther et al. | 705/408 |
| 5,960,418 | A * | 9/1999 | Kelly et al. | 705/408 |
| 6,111,951 | A * | 8/2000 | Guenther | 705/401 |
| 6,178,412 | B1 * | 1/2001 | Ratzenberger et al. | 705/408 |

FOREIGN PATENT DOCUMENTS

| | | |
|---|---|---|
| DE | OS 41 07 030 | 9/1992 |
| EP | 0 088 429 | 9/1983 |
| EP | 0 099 110 | 1/1984 |
| EP | 0 111 316 | 6/1984 |
| EP | 0 111 317 | 6/1984 |
| EP | 0 131 967 | 1/1985 |
| EP | 0 775 984 | 5/1997 |

* cited by examiner

*Primary Examiner*—Thomas A. Dixon
(74) *Attorney, Agent, or Firm*—Schiff Hardin LLP

(57) ABSTRACT

In an arrangement and method for entering postage the contents of a franking image into a postage meter machine, the franking image is initially incompletely pre-installed. The franking imprint data for a selection are ordered at least according to mail carrier and/or countries in a data bank of the manufacturer and can be allocated to the serial number of the machine. The postage meter machine serial number is entered in a step separate therefrom. As needed, data can be loaded or selected with a specific, country-specific and/or carrier-specific chip card in order to finally configure the postage meter machine.

8 Claims, 2 Drawing Sheets

METHOD AND ARRANGEMENT FOR ENTERING CONTENTS OF A FRANKING IMPRINT INTO A POSTAGE METER MACHINE

BACKGROUND OF THE INVENTION

1. Field of the Invention

The present invention is directed to a method and to an arrangement for entering the contents of the franking imprint into a postage meter machine of the type equipped with a chip card read unit and an appertaining control unit in order to simplify the country-specific or carrier-specific configuration of the postage meter machine.

2. Description of the Prior Art

Modern postage meter machines such as, for example, the thermal transfer postage meter machine disclosed in U.S. Pat. No. 4,746,234 utilize electronic digital printer devices. It is thus fundamentally possible to generate arbitrary franking imprints. These usually contain a customer-specific advertising slogan imprint, a machine-specific and location-specific municipal postmark and a mail carrier-specific value imprint. It is know to produce customized logos for a customer-specific advertising slogan imprint in an EPROM for installation into the postage meter machine, for example of the type T1000, manufactured by Francotyp-Postalia AG & Co. This T1000 is built in various country versions that differ from one another in terms of hardware due to the extremely different approval regulations of the various national postal authorities. It is required in country-specific fashion for postage meter machines to permanently install the franking imprint with the postal symbol (value stamp) or, respectively electronically store the form of the imprint in postage meter machines having electronic printers. In the manufacture of the T1000, the postage meter machines, for example, are initialized country-specifically or machine-specifically before they are assembled, for example with a further EPROM insertion.

It is been disclosed (in European Application 88 429, and 99 110) to store the machine-specific machine serial number in a non-volatile memory (EEPROM). Such a setting in known systems is likewise implemented during the manufacture. A reentry into such a configuration program is thereby prevented by an inhibit bit.

The program disclosed in European Application 111 316 is stored in the program memory of the postage meter machine and contains firmware branch points. The data bits stored in an external memory (NVM) allow the program to be permanently reconfigured on the basis of a conditional branch. A version disclosed in European Application 111 317 contains a firmware variable program stored in the program memory of the postage meter machine. The data bits stored in an external memory (NVM) allow the program to be reconfigured. After this EEPROM handling, a sealing of the postage meter machine usually follows, so that replacement of the EEPROM is not a simple to task.

As an alternative solution, U.S. Pat. No. 4,424,573 discloses programming the serial number of the postal device by a data center. In European Application 131 967, a configuring of the postage meter machine ensues via a keyboard externally connectable to the postage meter machine. The configuration event is only possible once. The outlay required in the configuring is disadvantageous.

When the postage meter machine contains a postage computer, then weight information are entered by a scale, and the postage meter machine calculates the postage value for the value imprint. For such a system, European Application 566 225 (U.S. Pat. No. 5,490,077) discloses a method for data input into a postage meter machine that employs chip cards or a cellular communication network in order to enter rate changes. These also include specific configuration chip cards that, however, are intended for the user. Such chip cards, which contain a number of non-volatile memories or memory areas that can be separately accessed, and a microprocessor, are relatively expensive. The user inserts them individually into a single chip card read unit in succession in order to serially transmit data representing various types of information into the postage meter machine. The data stored in the postage meter machine can then be accessed during operation thereof. The necessity of storing all data in the postage meter machine from the outset is thus eliminated, since at least some of the data can be subsequently transmitted as needed. All data that could be requested by one of the postage meter machines, however, must be pre-processed by the data center regardless of whether the data are used or communicated later. The high outlay is disadvantageous, particularly in the image processing associated with the service of producing franking images for many different mail carriers. This either leads to delays that can cause high telephone costs for the customer given a communication by modem, or requires the data processing capacity of the data center would be greatly expanded. Such an outlay on the part of the data center is not justified when only a few users have access to such services and, thus, the economic feasibility is not assured. For example, the Deutsche Post AG already allows different graphic designs for the image of the post horn in the value imprint and these are in use. The large amount of data to be stored then also requires an expensive chip card and appertaining, expensive chip card reader unit. The subsequent installation of a modem would then also require expensive hardware and software modifications. For some geographical areas, for example for countries of the European Union, the different currencies will be eliminated in future and be replaced by the Euro. Postage meter machines such as the T1000-EURO®JetMail® of Francotyp-Postalia AG & Co. can be used in the transition phase as well as after the conversion to the Euro. No monetary values in the postage meter machine are lost. A part of the value imprint could therefore be designed uniformly in future, and only differences in the graphic design remaining due to the different mail carrier companies. Universal franking devices that are also suitable for private carriers (UPS, Federal Express, etc.) are of interest in the future.

SUMMARY OF THE INVENTION

An object of the present invention is to provide an arrangement for setting the contents of the franking imprint for postage meter machines that avoids the disadvantages of the prior art and can be realized in economic fashion. A further object is to provide find a method for making carrier-specific and/or country-specific postal imprints available that is suitable for various distribution areas independently of the manufacturing logistics.

The object is inventively achieved in a method and apparatus wherein permanently programmed postage stamp data are made available in a non-interchangeable memory of a postage meter machine that has additional memory areas in order to load further, specifying data, so that the combination thereof with the stored postage imprint data allows a carrier-specific and country-specific franking imprint to be formed. This is especially advantageous when the postage meter machine is to be configured to a national, governmental mail service. When the postage meter machine is to be configured for a private, internationally operating postal company, at least one loading of the specific postal stamp data of this postal company ensues. It is possible that the arrangement and form of the graphic design is the same for some countries. Of course, the postal stamp can exhibit country-specific differences that are typical for the dispatching country such as, for example, the national language or the currency. However, it can be meaningful for countries having the same currency, for example the Euro in Europe, and same graphic design, to select an internationally recognized language, for example English. In such a case, it is possible that the same postal stamp of the mail carrier is valid for several countries. Inventively, the further, specific data are different carrier-specific data and/or the local data for the location at which the postage meter machine is to be utilized. The further, specifying data are loaded at the end, this loading ensuing remote from the place of use.

The further, specifying data that are required for a complete franking imprint can be loaded at the end of the manufacturing process by the manufacturer, or at least remote from the subsequent place of use by interface, in order to produce a carrier-specific machine from a country-specific machine, or vice versa, in the manufacturing process or at a location authorized for this purpose or at the dealer, i.e. at the very end, this being set in conformity with the requirements of specific mail carriers. The interface, for example, is a chip card reader unit, preferably an inexpensive version for which at least one specific chip card is offered and that is inserted into the reader unit before delivery of the postage meter machine to the place of use.

For operating an electronic, digitally driveable printer, alternatively, a set of permanently programmed, non-erasable, carrier-specific and/or country-specific franking imprint data are offered in a non-replaceable memory of the postage meter machine, with sub-sections of the set producing the complete imprint, in combination. The sub-sections are image data files of a control data file that a microprocessor of the postage meter machine processes together with picture element data files in order to produce at least one value stamp image. Further sub-image data files can be allocated to the image data files, for example for the postage value, etc. The data files are provided and stored by the manufacturer of the postage meter machine in a first step. More data files are made available than would be required for a franking imprint. The serial number is entered in a step separate therefrom. Moreover, the installation of an interface, for example of a chip card reader unit, ensues in all types of postage meter machines. The franking imprint can then be selected with a specific chip card.

DESCRIPTION OF THE PREFERRED EMBODIMENTS

Figure 1:
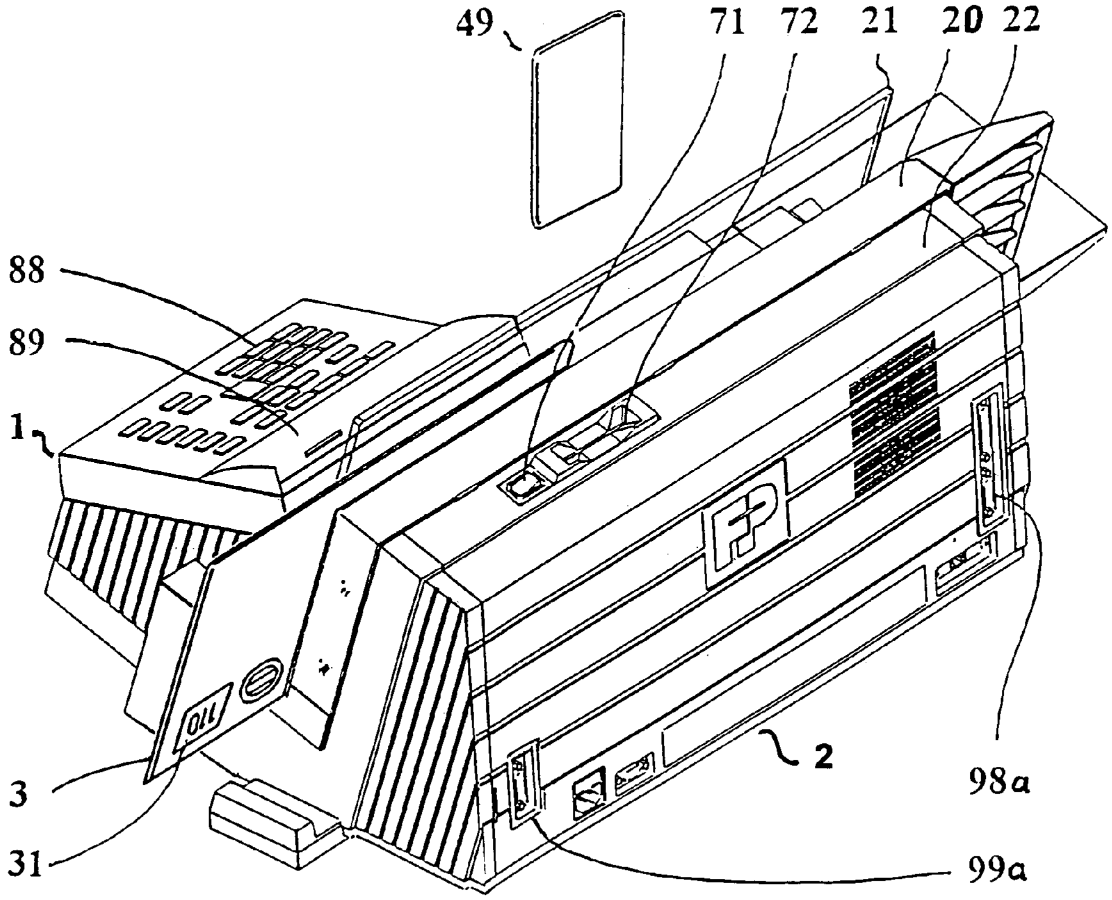
FIG. 1 perspective view of a postage meter machine constructed and operating in accordance with the invention from behind.

FIG. 1 shows a perspective view of the inventive postage meter machine from the back. The postage meter machine is composed of a meter 1 and a base 2. The latter is equipped with a chip card reader unit 70 (see FIG. 2) that is arranged behind the guide plate 20 and is accessible from the upper edge 22 of the housing. After the postage meter machine is switched on with the switch 71, a chip card 49 is inserted into the insertion slot 72 from top to bottom. (More than one chip card may be used; the chip card 49 represents all such chip cards.) A letter 3 supplied standing on edge and that has a surface to be printed lying against the guide plate 20 is then printed with a franking imprint in conformity with the input data, whereby this franking imprint includes a value imprint 31. The letter delivery opening is laterally limited by a transparent plate 21 and by the guide plate 20.

Figure 2:
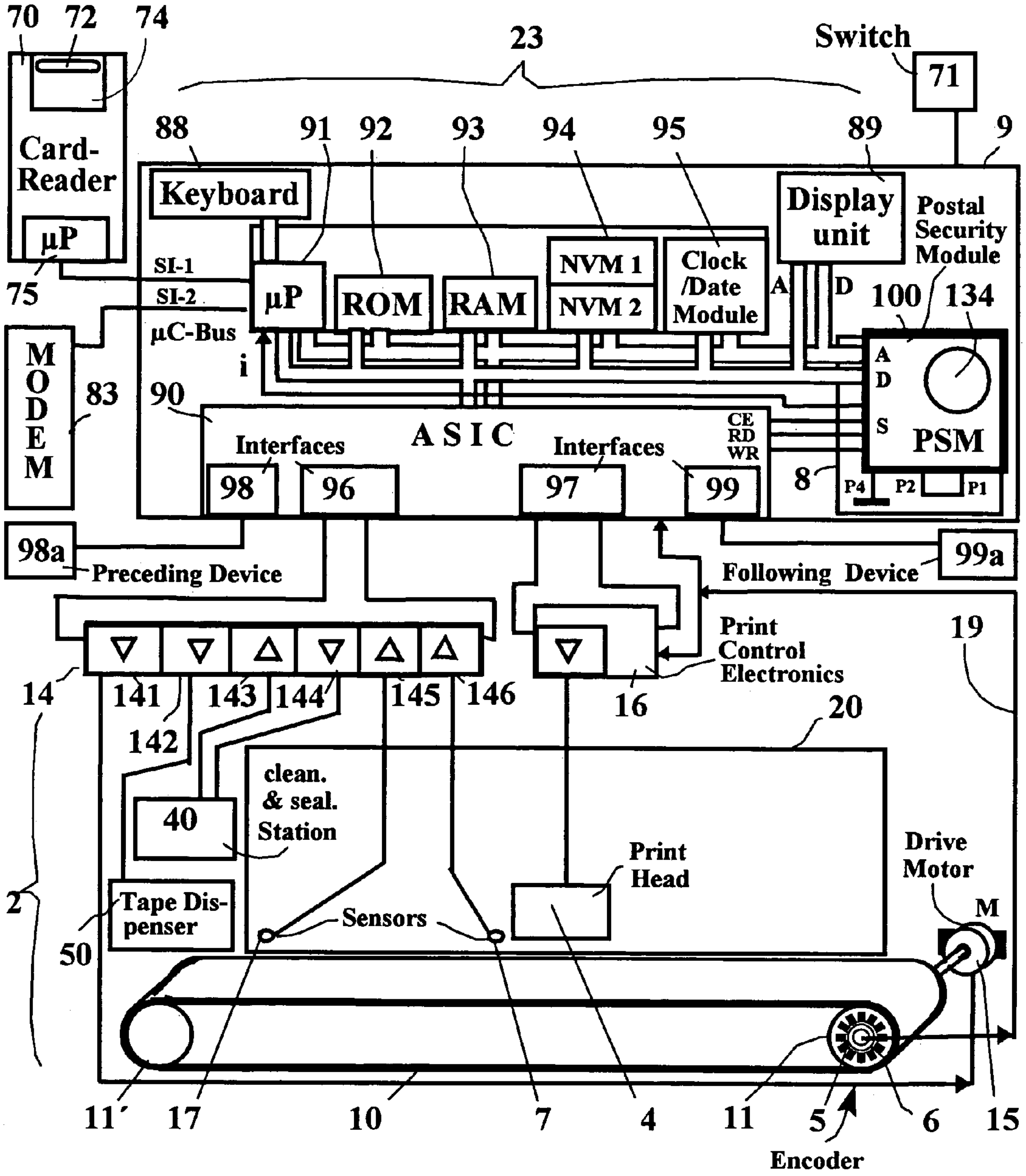
FIG. 2 block circuit diagram for setting the function of the postage meter machine of FIG. 1 and for driving the printer device thereof.

FIG. 2 shows a block circuit diagram of a postage meter machine that is equipped with a chip card reader unit 70 for reloading change data by chip card and with a printer with a printhead 4 that is controlled by a control unit 23. The control unit 23 has a motherboard 9 equipped with a microprocessor 91 with appertaining memories 92, 93, 94, 95.

The program memory 92 contains an operating program at least for printing and contains at least security-relevant component parts of the program for a pre-determined format change of a part of the operating data.

The main memory RAM 93 serves for volatile intermediate storage of intermediate results. The non-volatile memory NVM 94 serves the purpose of non-volatile intermediate storage of data, for example at least the postage meter machine serial number, carrier-specific and/or country-specific configuration data and, if necessary, other configuration data as well as value imprint image data. The calendar/clock module 95 likewise contains addressable but non-volatile memory areas for non-volatile intermediate storage of intermediate results or of known program parts as well (for example, for the DES algorithm). It is provided that the control unit 23 is connected to the chip card reader unit 70, whereby the microprocessor 91 of the control unit 23 being programed, for example, to load the operating data N from the memory area of a chip card 49 into corresponding memory areas of the control unit 23 for use of said operating data. A first chip card 49 inserted into an insertion slot 72 of the chip card reader unit 70 allows a reloading of a data set into the postage meter machine 1 for a configuration. The chip card 49, for example, contains a mail carrier identifier in order to generate a stamp image with the postage meter machine and to frank the postal matter in conformity with the desired mail carrier.

The chip card reader unit 70 is composed of a mechanical carrier for the microprocessor card and a contacting unit 74. The latter allows a secure mechanical holding of the chip card 49 in a read position and an unambiguous signaling of when the read position of the chip card is reached in the contacting unit 74. The microprocessor card with the microprocessor 75 has a programmed read capability for only specific types of storage cards or chip cards. The interface to the control unit 23 is a serial interface according to RS 232 standard. The data transmission rate is a minimum of 1.2 K Baud. Turning the power supply on ensues with a switch 71 connected to the motherboard 9. After the power supply is turned on, a self-test function with a readiness message ensues. The demands made of the processor performance are so low that the chip card reader unit 70 can be a type having a reduced processor performance, thereby reducing cost. The scope of the data to be stored in a configuration chip card 49 is especially small when only a selection from a number of data sets need be undertaken therewith, these data sets being pre-stored in a non-volatile memory of the postage meter machine 1. The number of data sets is defined by the differences in the relevant currencies, languages, mail carriers and countries.

The control unit 23 forms the actual meter 1 with the components 91 through 95 of the aforementioned motherboard 9. The meter 1 also has a keyboard 88, a display unit 89 as well as an application-specific circuit (ASIC) 90, and an interface 8 for the postal security module (PSM) 100. The security module (PSM) 100 is connected via a control bus to the aforementioned ASIC 90 and to the microprocessor 91 and is also connected via the parallel pC bus at least to the components 91 through 95 of the motherboard 9 and to the display unit 89. The control bus carries lines for the signals CE, RD and WR between the security module 100 and the aforementioned ASIC 90. The microprocessor 91 preferably has a pin for an interrupt signal i emitted by the security module 100, further terminals for the keyboard 88, a serial interface SI-1 for the connection of the chip card reader unit 70 and a serial interface SI-2 for the optional connection of a modem. With the modem, for example, the credit stored in the non-volatile memory of the postal security module 100 can be incremented.

The postal security module 100 is surrounded by a secured housing and has a back-up battery 134. An accounting in terms of hardware is implemented in the postal security module 100 before every franking imprint. The accounting ensues independently of cost centers. The postal security module 100 can be implemented internally as was disclosed in greater detail in European Application 789 333.

The ASIC 90 has a serial interface circuit 98 to a preceding device 98*a* in the mail stream, a serial interface circuit 96 to sensors and actuators of the printer, a serial interface circuit 97 to print control electronics 16 for the print head 4 and a serial interface circuit 99 to a device 99*a* following the printer in the mail stream. German OS 197 11 997 discloses a modified embodiment for the peripheral interface that is suitable for a number of peripheral devices (stations).

The interface circuit 96 coupled to the interface circuit 14 located in the machine base 2 sets up at least one connection to sensors and to actuators, for example an actuator for the drive motor 15 and an actuator for a cleaning and sealing station 40 for the ink jet print head 4, as well as an actuator for a tape dispenser 50 in the machine base 2. The basic arrangement and the interaction between inkjet print head 4 and the cleaning and sealing station 40 are described in German PS 197 26 642.

One of the aforementioned sensors arranged in the guide plate 20 is a sensor 17 which serves the purpose of preparing the print triggering given letter transport. The sensor 7 recognizes leading edge of the letter 3 for print triggering given letter transport. The conveyor is composed of a conveyor belt 10 and two drums 11, 11'. One of the drums is the drive drum 11, driven by the motor 15; the other is the entrained tensioning drum 11'. Preferably, the drive drum 11 is a toothed drum and the conveyor belt 10 is a toothed belt, which assures positive force transmission. Preferably, the drive drum 11 together with an incremental generator 5 is firmly seated on a shaft. The incremental generator 5, for example, is as a slotted disk that interacts with a light barrier 6 and outputs an encoder signal to the motherboard 9 via the line 19.

The individual print elements of the print head 4 are connected within its housing to the print head electronics 16, so the print head 4 can be driven for a purely electronic printing. The print control ensues on the basis of the path control of the letters, with the selected imprint offset being taken into consideration, this being entered via the keyboard 88 or as needed by the chip card 49 and being stored in non-volatile fashion in the memory NVM 94. An intended imprint thus derives the imprint offset (without printing), the franking imprint image and, if present, further print images for advertising slogan, shipping information (selective imprints) and additional messages that can be edited. The non-volatile memory NVM 94 has a plurality of memory areas. These include a memory area wherein postage meter machine serial number is stored in non-volatile fashion.

The manufacturing process of the postage meter machine is divided into a number of steps, with one of the last steps being the country-specific and/or carrier-specific editing of the franking imprint and assignment of the machine serial number. The "manufacturing process" means all fabrication and configuration steps that lead to a functional franking device. The configuration of the country-specific and/or carrier-specific data alternatively can ensue outside the manufacturing plant in a subsidiary or at a dealer authorized to do this by the manufacturer, remote from the use location. The advantage of the inventive method is that all franking devices are physically produced in an identical, way, and splitting is only necessary at the end of the manufacturing process. The last steps needed for this purpose can be separated in time and space from the physical manufacturing steps. It can be left to the foreign subsidiaries and commercial representatives as to how they shall organize this country-specific and/or carrier-specific configuration. The respective logistics differ for different distribution areas. For example, the method is suitable for parts of the European market where the graphic design of the postage stamp, the script (for example, Roman) and, possibly, the currency unit (for example, Euro) are largely uniform. The existing interface is used for a specific card 49 in order to enter data into the postage meter machine 1 to carry out the final configuration thereof, by storing at least an identifier for the appertaining country in the respective language and the carrier logo in defined fashion. Even though the versatility of combinations is large, only the permitted (usable) combinations are, of course, of interest.

Figure 3:
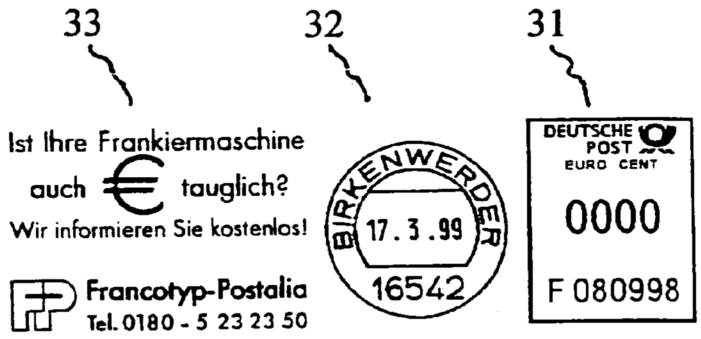
FIG. 3 shows franking imprint produced in accordance with the invention.

FIG. 3 shows a franking stamp imprint in a form it takes in Germany after the currency conversion to Euro. Printing begins from right to left with the value imprint 31, the postmark 32 and, if desired, an advertising slogan 33. The advertising slogan 33 can be freely determined or selected by the customer. The logo of Deutsche Post AG is a post horn in the upper right corner of a rectangular value imprint frame. The designation EURO CENT for the currency unit resides over the window with the value 0000. An identifier (company and machine number) is printed therebelow.

Country versions with uniform script and currency exist in Europe which differ from one another only according to the language and the selected carrier. When a cover agency of the national European postal services assumes responsibility in future for the mail carrying, the differentiation according to national mail carriers can also be eliminated.

A bilingual format can be documented in the franking imprint with respect to the language such as, for example, in Belgium or South Africa. The graphic design of the postage stamp frame and of the postmark frame deviates from the appearance that is standard in most countries, for example in South Africa and Holland.

Other parts of the European market must be more highly specified; for example, a specific country version already exists with the Greek alphabet and language as well as with a specific carrier logo, for which reason the Greek alphabet is also subsequently loaded with the chip card.

In general, the script and the currency are country-specific. Thus, a specific country version with the Cyrillic alphabet, the currency of Rubles, but no specific carrier logo is used for Belorussia, since there is no carrier selection in some countries, i.e. logo, script and currency are rigidly prescribed.

The USA represents an antithetical example, numerous private mail carriers (couriers) operate therein in addition to the governmental postal authorities USPS.

It is assumed for the practical embodiment of the method that data taking the common characteristics in the distribution area into consideration are installed in the first step and data taking the differences in the distribution area into consideration are installed in the second step. Two versions thereby proceed as follows.

First, in a first configuration step, carrier-specific and/or country-specific data that correspond to a uniform basic franking image are non-volatilely stored in the memory 94 of the postage meter machine 1. The postage meter machine serial number is entered in a step separate therefrom. The franking image format data for the selection are arranged in a data bank of the manufacturer organized at least according to mail carriers and/or countries and can be allocated to a serial number. A postage meter machine 1 is considered pre-configured after a first step when defined data in the aforementioned data bank are allocated to a postage meter machine serial number. As needed, this postage meter machine 1 can be finally configured in a second step.

In the first version, the print image data are transferred from a chip card into the graphics memory of the postage meter machine 1 in order to enable at least the generation of the carrier-specific and/or country-specific logos (for example, postal symbols). After the loading and storing of the data, the chip card 49 is removed from the chip card reader unit 70. The configuration with the same chip card 49 can only be accomplished during the initial insertion. An inhibit bit is automatically set in a memory cell of the non-volatile memory 94 after the removal of the chip card 49 in order to prevent an unauthorized, repeat configuration. Every further insertion of a different chip card in the future can modify such a configuration, with an appropriate authorization procedure being executed by the further chip card. This is particularly advantageous given leased postage meter machines. When such a machine is returned to the dealer in the same distribution area at the end of its lease, a re-configuration can ensue at the dealer with a suitable chip card 49. The print image data transferred from a chip card 49 into the graphics memory of the postage meter machine are, for example, related to a specific carrier and to a specific country. Given some private mail carriers, the stored, carrier-specific data are country-independent, pure graphic data (logos), and the country-specific data (language) are pure word data or refer to the national currency.

In one form of the first version communicated country-specific data are combined with the carrier-specific data stored in the preceding step, or vice versa. When the distribution area is limited to one country (for example, India), all country-specific data are stored in the first step and the loading of the carrier-specific data ensues after the selection of the desired carrier. In the distribution area of North America (i.e., USA and Canada), it is possible also to proceed oppositely in that the machines are first set to a carrier and are only set to the desired country as a final step. The term "country" as used herein means the territory under the authority of a single overriding governmental sovereign. The prior production of machines pre-configured to a carrier in advance is particularly meaningful for the postage meter machine manufacturer when the carrier has a relatively large market share.

In a another form of the first version uses more than two configuration steps, preferably with a number of chip cards, are executed. Each chip card carries an identifier regarding the combination that can be undertaken with it, for example for a distribution area within the European union. The currency can then already be determined in the first configuration step. In a second configuration step, the remaining specification data such as, for example, the logo of the national mail carrier, can then be loaded from a further chip card in a second configuration step. In a third configuration step, the city or the future receiving office can then be loaded. These three steps can be carried out at different locations. Thus, the definition of the distribution area and of the country can be carried out by the manufacturer. The postage meter machine pre-configured in this way is shipped to the national subsidiary of the defined country. A stipulation of the receiving office desired by the dealer or wholesaler is implemented at the defined country with the third configuration step. This graduated method has the advantage that final customer particulars need not be present for the pre-fabrication, or no customer order must be present, but the machines can be produced for warehousing, (inventory) thereby lowering the logistical manufacturing costs. Another advantage is that all possible data sets need not be stored at one location. Alternatively to the chip card, some other interface, for example V 24, can be used in order to transmit data sets that are stored in a workstation or in a PC.

In the second version, the chip card 49 is inserted only in order to undertake a selection among the postal symbols that are stored in the postage meter machine and can be displayed via the display 89. The franking imprint image data have already been stored for selection in the non-volatile memory of the postage meter machine 1 in a preceding step, organized according to carrier and/or country. The print image data have an identification number allocated thereto, for example CIN (carrier identification number), SIN (state identification number), etc., so that only the respective identification numbers need to be loaded with the chip card 49 into a particular memory area of the non-volatile memory 94 of the postage meter machine 1 in order to produce a defined allocation for generating the desired franking imprint format. In one form, the non-selected, stored postal symbols are subsequently automatically erased by the postage meter machine controller or upon removal of the chip card 49 from the chip card reader unit 70.

Although modifications and changes may be suggested by those skilled in the art, it is the intention of the inventor to embody within the patent warranted hereon all changes and modifications as reasonably and properly come within the scope of his contribution to the art.

I claim:

1. A method for entering contents of a franking imprint into a postage meter machine, said postage meter machine having an electronic, digitally operating printer and said contents being employed for printing said franking imprint with said printer, said method comprising the steps of:

storing a set of data in a non-volatile, non-removable memory of said postage meter machine by permanently programming said set of data at a manufacturing location, said data being selected from the group consisting of different country-specific data and different carrier-specific data;

installing a data communication interface in said postage meter machine; and configuring said franking imprint of said postage meter machine prior to use at a use location remote from said manufacturing location for at least one of a selected carrier and a selected country, by communicating with said postage meter machine via said interface, to select at least one of said permanently programmed carrier-specific data and country-specific from said non-removable memory data.

2. A method as claimed in claim 1 comprising installing a chip card reader as said interface, and configuring said postage meter machine using a chip card insertable into said chip card reader before delivery of said postage meter machine to said use location.

3. A method as claimed in claim 2 comprising storing said set of data in said non-removeable memory of said postage meter machine in a non-erasable manner at said manufacturing location, and subsequently selecting among said of different carrier-specific data by communicating via said interface with a country-specific chip card inserted into said chip card reader, and setting an inhibit bit in said non-volatile memory after removing said chip card to prevent any further configuration of said postage meter machine.

4. A method as claimed in claim 2 wherein said chip card makes both a carrier-specific selection among said different carrier specific data and a country-specific selection among said different country-specific data.

5. A method as claimed in claim 1 wherein said interface comprises a chip card reader and comprising configuring said postage meter machine at said manufacturing location for a selected country wherein said postage meter machine is to be used by inserting a country-specific chip card into said chip card reader and combining country-specific data on said chip card with said permanently stored carrier-specific data.

6. A method as claimed in claim 1 wherein said interface comprises a chip card reader and comprising configuring said postage meter machine at said manufacturing location for a selected country wherein said postage meter machine is to be used by inserting a carrier-specific chip card into said chip card reader and combining carrier-specific data on said chip card with said permanently stored country-specific data.

7. A method as claimed in claim 1 wherein said interface comprises a chip card reader, and including the additional step of transferring print image data for said franking imprint from a chip card inserted in said chip card reader into a graphic memory of said postage meter machine for generating at least a carrier specific franking imprint, and after removal of said chip card setting an inhibit bit in said graphics memory to prevent any further configuration of said postage meter machine.

8. An arrangement for entering contents of a franking imprint into a postage meter machine comprising:

a chip card reader adapted to receive a chip card therein containing selection data;

a franking imprint memory into which data representing a franking imprint are loadable;

a microprocessor connected to said chip card reader;

a permanently installed non-volatile memory connected to said microprocessor, said non-volatile memory containing memory areas in which different carrier-specific data and different country specific data are stored; and said microprocessor receiving said selection data from a chip card inserted in said chip card reader and loading at least one of carrier-specific data and country-specific data into said franking imprint memory from said non-volatile memory dependent on said selection data to configure said franking imprint and thereafter inhibiting said franking imprint memory to prevent any further configuration thereof.

* * * * *